(12) United States Patent
Plugin

(10) Patent No.: US 10,210,072 B2
(45) Date of Patent: *Feb. 19, 2019

(54) IDENTIFYING SYNTAXES OF DISPARATE COMPONENTS OF A COMPUTER-TO-COMPUTER MESSAGE

(71) Applicant: International Business Machines Corporation, Armonk, NY (US)

(72) Inventor: Kirill V. Plugin, South Riding, VA (US)

(73) Assignee: International Business Machines Corporation, Armonk, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 15/089,759

(22) Filed: Apr. 4, 2016

(65) Prior Publication Data

US 2016/0217060 A1 Jul. 28, 2016

Related U.S. Application Data

(63) Continuation of application No. 12/624,596, filed on Nov. 24, 2009, now Pat. No. 9,317,256.

(51) Int. Cl.
*G06F 17/00* (2006.01)
*G06F 11/36* (2006.01)
*G06F 8/33* (2018.01)

(52) U.S. Cl.
CPC ............ *G06F 11/3664* (2013.01); *G06F 8/33* (2013.01)

(58) Field of Classification Search
CPC .................................... G06F 8/33; G06F 9/44

(Continued)

(56) References Cited

U.S. PATENT DOCUMENTS 6,182,029 B1 1/2001 Friedman
6,418,400 B1 7/2002 Webber
(Continued)

FOREIGN PATENT DOCUMENTS

WO 200627777 A2 3/2006

OTHER PUBLICATIONS

M.P. Papazoglou et al. "Service Oriented Architectures: Approaches, Technologies and Research Issues," The VLDB Journal, 2007, pp. 389-415.

(Continued)

*Primary Examiner* — Stephen Hong
*Assistant Examiner* — Matthew Ludwig
(74) *Attorney, Agent, or Firm* — Law Office of Jim Boice

(57) ABSTRACT

A method identifies syntaxes of disparately syntaxed components of a message file. One or more processors receive a message at a computer, where the message comprises disparately syntaxed components. Processor(s) detect a selection of a selected component from the disparately syntaxed components. Processor(s) display a description of a syntax used by the selected component on a user interface, where the description of the syntax displayed on the user interface comprises a description of what each data element, within the selected component, represents. Processor(s) identify a set of leading characters for the selected component, where the set of leading characters for the selected component organizes the disparately syntaxed components according to their respective syntax rules. Processor(s) arrange and display the selected component in a spreadsheet according to the set of leading characters, where the disparately syntaxed components are displayed on the spreadsheet according to their respective syntax rules.

20 Claims, 5 Drawing Sheets

(58) Field of Classification Search
USPC .................... 715/234, 254, 255, 209, 237
See application file for complete search history.

(56) References Cited

U.S. PATENT DOCUMENTS

| | | |
|---|---|---|
| 6,718,516 B1 | 4/2004 | Claussen et al. |
| 7,584,422 B2 | 9/2009 | Ben-Yehuda et al. |
| 8,161,078 B2 | 4/2012 | Gaurav et al. |
| 8,996,914 B2* | 3/2015 | King .................... G06F 11/327 |
| | | 714/20 |
| 2001/0044811 A1 | 11/2001 | Ballantyne et al. |
| 2004/0268229 A1 | 12/2004 | Paoli et al. |
| 2005/0154978 A1 | 7/2005 | Albornoz et al. |
| 2006/0031757 A9 | 2/2006 | Vincent, III |
| 2006/0259456 A1 | 11/2006 | Falk et al. |
| 2008/0072160 A1 | 3/2008 | Gaurav et al. |
| 2008/0235251 A1* | 9/2008 | Shmueli .............. G06F 17/2725 |
| 2009/0254971 A1* | 10/2009 | Herz ................... G06Q 10/10 |
| | | 726/1 |

OTHER PUBLICATIONS

W. Emmerich et al. "The Impact of Research on the Development of Middleware Technology," ACM Transactions on Software Engineering and Methodology, vol. 17, No. 4, Article 19, Aug. 2008, pp. 19:1-19:48.

M. Brun et al. "Reducing Barriers for E-Business in SME's Through an Open Service Oriented Infrastructure," ICEC'06, Aug. 14-16, 2006, ACM, pp. 1-8.

* cited by examiner

IDENTIFYING SYNTAXES OF DISPARATE COMPONENTS OF A COMPUTER-TO-COMPUTER MESSAGE

BACKGROUND

The present disclosure relates to the field of computers, and specifically to the messages between computers. Still more particularly, the present disclosure relates to testing various disparate components of a message to identify disparate formats of the message.

SUMMARY

In an embodiment of the present invention, a method identifies syntaxes of disparately syntaxed components of a message file. One or more processors receive a message at a computer, where the message comprises disparately syntaxed components. Processor(s) detect a selection of a selected component from the disparately syntaxed components. Processor(s) display a description of a syntax used by the selected component on a user interface, where the description of the syntax displayed on the user interface comprises a description of what each data element, within the selected component, represents. Processor(s) identify a set of leading characters for the selected component, where the set of leading characters for the selected component organizes the disparately syntaxed components according to their respective syntax rules. Processor(s) arrange and display the selected component in a spreadsheet according to the set of leading characters, where the disparately syntaxed components are displayed on the spreadsheet according to their respective syntax rules.

In an embodiment of the present invention, a computer program product comprises one or more computer readable storage mediums and program instructions stored on at least one of the one or more storage mediums. The stored program instructions include: program instructions to open a message file, where the message file comprises disparately syntaxed components; program instructions to detect a selection of a selected component from the disparately syntaxed components; program instructions to display a description of a syntax used by the selected component on a user interface, where the description of the syntax displayed on the user interface comprises a description of what each data element, within the selected component, represents; program instructions to identify a set of leading characters for the selected component, where the set of leading characters for the selected component organizes the disparately syntaxed components according to their respective syntax rules; program instructions to arrange and display the selected component in a spreadsheet according to the set of leading characters, where the disparately syntaxed components are displayed on the spreadsheet according to their respective syntax rules; program instructions to define a channel definition for messages, where the channel definition includes a message queue name, an error queue name, a database user resource locator (URL), and login credentials to use as a syntax for messages on a channel; program instructions to receive a string on the channel; program instructions to determine that a data segment in the string is not properly syntaxed for the channel definition for the channel; and program instructions to, in response to determining that the data segment in the string is not properly syntaxed for the channel, write an entry into an error queue that includes a time stamp of the string that is not properly syntaxed for the channel.

In an embodiment of the present invention, a computer system includes one or more processors, one or more computer readable memories, and one or more computer readable storage mediums, and program instructions stored on at least one of the one or more storage mediums for execution by at least one of the one or more processors via at least one of the one or more memories. The stored program instructions include: program instructions to open a message file, where the message file comprises disparately syntaxed components; program instructions to detect a selection of a selected component from the disparately syntaxed components; program instructions to display a description of a syntax used by the selected component on a user interface, where the description of the syntax displayed on the user interface comprises a description of what each data element, within the selected component, represents; program instructions to identify a set of leading characters for the selected component, where the set of leading characters for the selected component organizes the disparately syntaxed components according to their respective syntax rules; program instructions to arrange and display the selected component in a spreadsheet according to the set of leading characters, where the disparately syntaxed components are displayed on the spreadsheet according to their respective syntax rules; program instructions to define a channel definition for messages, where the channel definition includes a message queue name, an error queue name, a database user resource locator (URL), and login credentials to use as a syntax for messages on a channel; program instructions to receive a string on the channel; program instructions to determine that a data segment in the string is not properly syntaxed for the channel definition for the channel; and program instructions to, in response to determining that the data segment in the string is not properly syntaxed for the channel, write an entry into an error queue that includes a time stamp of the string that is not properly syntaxed for the channel.

BRIEF DESCRIPTION OF THE DRAWINGS

FIG. 4 depicts an exemplary window for reading a message component from a queue in a messaging system;

FIG. 5 illustrates an exemplary window for querying a database for a message component.

DETAILED DESCRIPTION

Figure 1:
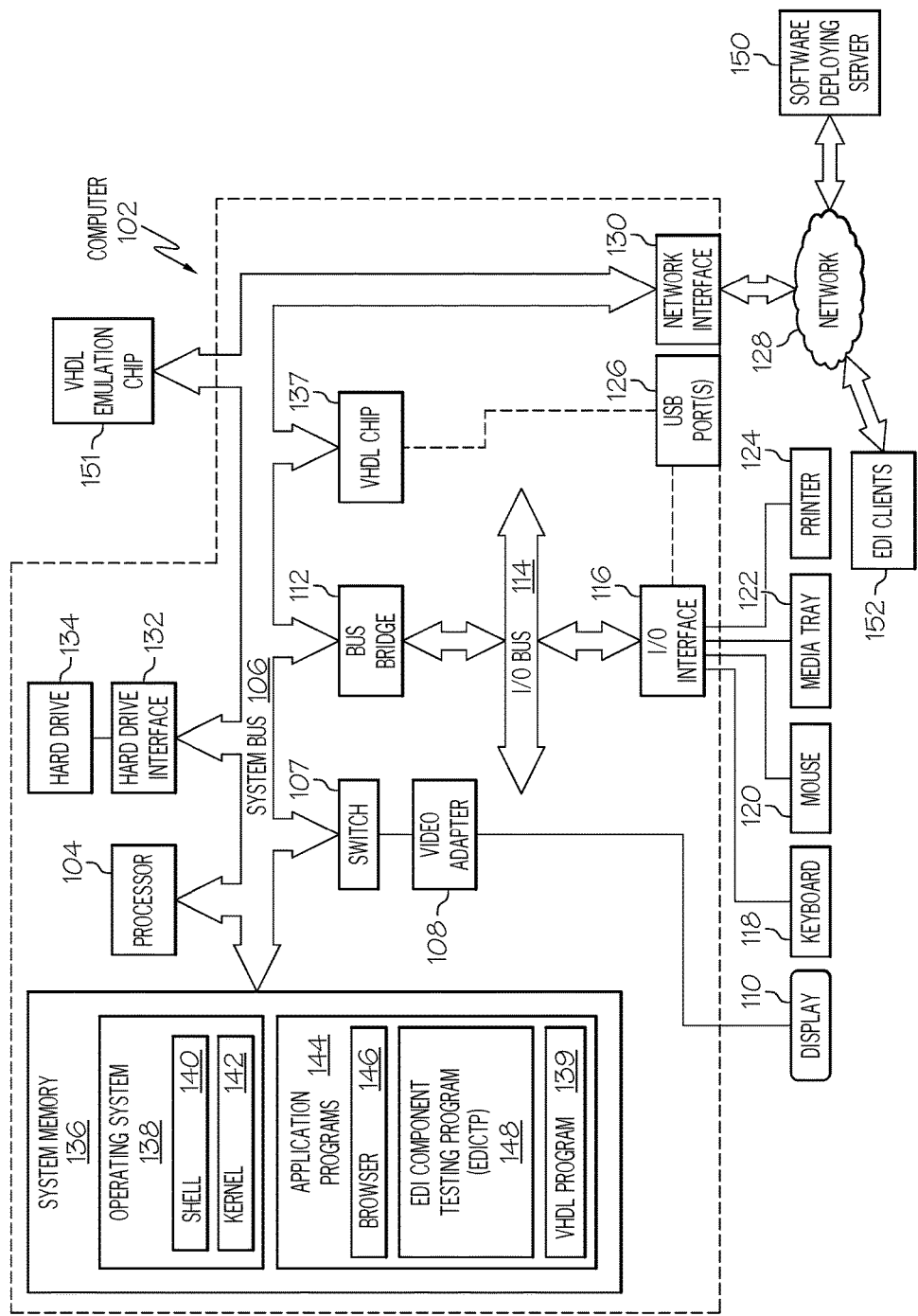
FIG. 1 depicts an exemplary computer in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and/or electronic data interchange (EDI) clients 152. Note that EDI clients 152 are described below as transceiving messages that conform to the EDI protocol. However, in one embodiment EDI clients 152 utilize any protocol in which disparately syntaxed components make up a computer-to-computer message.

Computer 102 includes a processor 104 that is coupled to a system bus 106. Processor 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., electronic data interchange component testing program—EDICTP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a electronic data interchange component testing program (EDICTP) 148. EDICTP 148 includes code for implementing the processes described below, including those described in FIGS. 2-7. In one embodiment, computer 102 is able to download EDICTP 148 from software deploying server 150, including in an on-demand basis. Note further that, in one embodiment of the present invention, software deploying server 150 performs all of the functions associated with the present invention (including execution of EDICTP 148), thus freeing computer 102 from having to use its own internal computing resources to execute EDICTP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from EDICTP 148 causes VHDL program 139 to configure VHDL chip 137, which may be an FPGA, ASIC, etc.

In another embodiment of the present invention, execution of instructions from EDICTP 148 results in a utilization of VHDL program 139 to program a VHDL emulation chip 151. VHDL emulation chip 151 may incorporate a similar architecture as described above for VHDL chip 137. Once EDICTP 148 and VHDL program 139 program VHDL emulation chip 151, VHDL emulation chip 151 performs, as hardware, some or all functions described by one or more executions of some or all of the instructions found in EDICTP 148. That is, the VHDL emulation chip 151 is a hardware emulation of some or all of the software instructions found in EDICTP 148. In one embodiment, VHDL emulation chip 151 is a programmable read only memory (PROM) that, once burned in accordance with instructions from EDICTP 148 and VHDL program 139, is permanently transformed into a new circuitry that performs the functions needed to perform the process described below in FIGS. 2-7.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Note that the present disclosure is described in exemplary manner as being utilized in an electronic data interchange (EDI) environment. EDI refers to a structured transmission of data between computers and/or enterprises. Examples of such structured transmissions abound in business-to-business (b2b) applications, in which a structure format for a document (e.g., a purchase order, an invoice, a request for service, etc.) is sent from one enterprise to another. Such EDI messages can be disparately syntaxed, in which one component of the message uses a first syntax (e.g., a prescribed layout for a customer's address, in which the street number must be less than five numerals, the street name must start with a capital letter, etc.), while another component uses a second syntax (e.g., the customer's name on the EDI message must include a capitalized middle initial) that is different from the first syntax. Thus, while the present disclosure utilizes EDI as an exemplary structure, the process described herein applies to any computer-to-computer message that has disparately syntaxed components. Note that the term "message" and "message file" are used interchangeably herein.

Described herein is a tool that allows editing EDI messages that are stored in text files. When a user opens the message file through the File-Open menu, the presently described tool detects the format of the message (e.g., Customs Automated Manifest Interface Requirements (CAMIR), American National Standards Institute (ANSI) X.12, etc.) and activates an appropriate message map. Thus, with reference now to user interface (UI) 200 shown in FIG. 2, the received message has a message body 202 that is formatted according to the ANSI X.12 standard. Note that UI 200 is also able to display a CAMIR formatted message, which could be viewed if tab 204 instead of tab 206 had been clicked by the user. As the user navigates through the message body 202, EDICTP 148 (shown in FIG. 1) detects the currently user-selected data segment 208 and data element 210, and provides a description of the data element 210 (i.e., data element "USCS" is a "Code identifying party receiving transmission; codes agreed to by trading partners" that follows the "USCSAES" format defined by those trading partners). In one embodiment, EDICTP 148 breaks down the current user-selected data segment 208 and displays it by data element for easy editing, as depicted in window 212 at the bottom of UI 200. EDICTP 148 applies data changes and preserves the current data segment formatting according to the appropriate EDI map (e.g., a lightweight directory access protocol (LDAP) or other tree diagram). To locate a particular data element in the body of the message, the user selects the group and data segment in the message map 214, depicted on the right side of the UI 200, and double-clicks on the data element 216. EDICTP 148 locates and highlights the data element 210. Clicking Next button 218 will highlight the next appearance (not shown) of the data element 210 in the message body 202 of the message if such exists.

Figure 2:
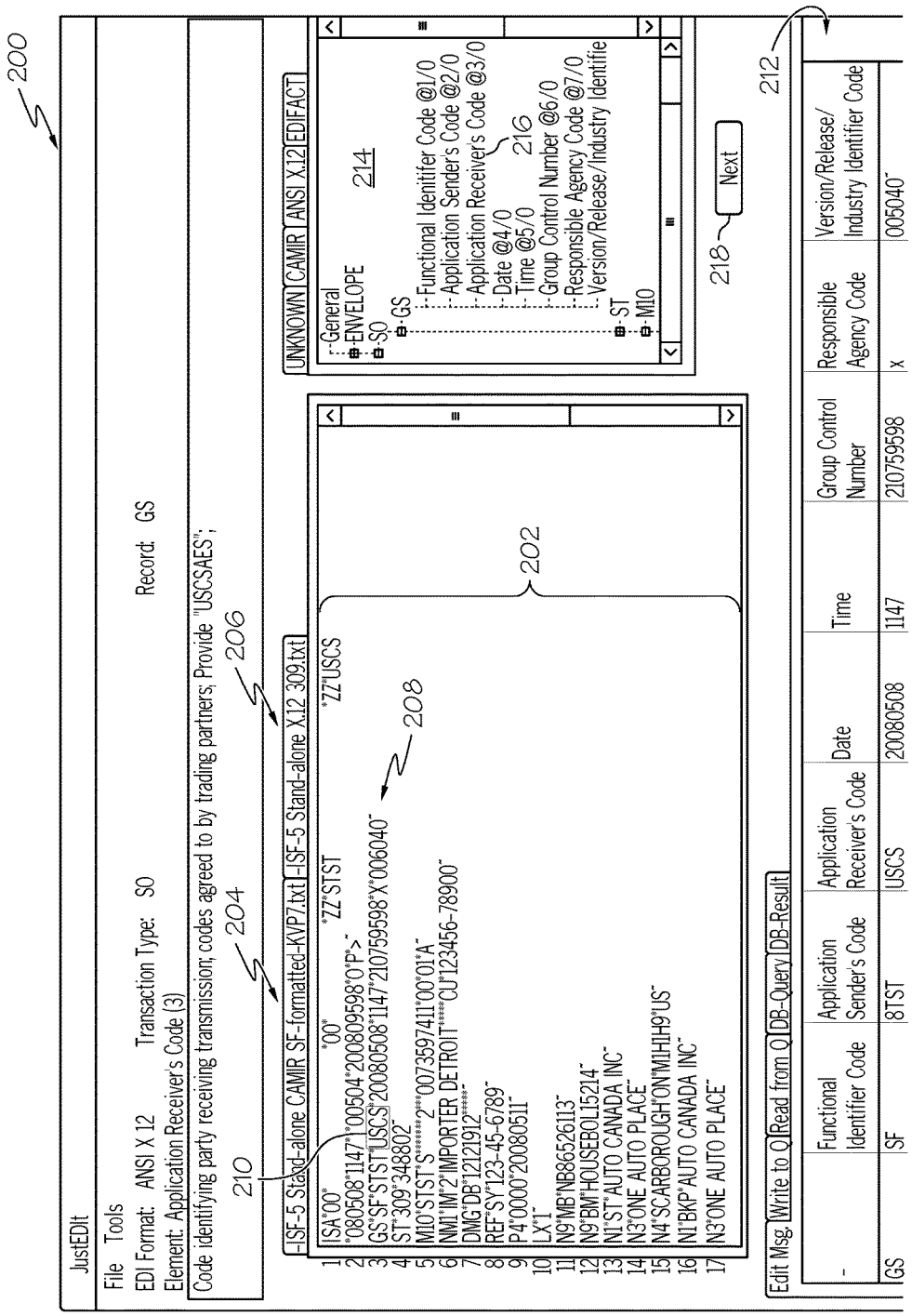
FIG. 2 illustrates an exemplary user interface depicting a message file having disparately syntaxed components.
Figure 3:
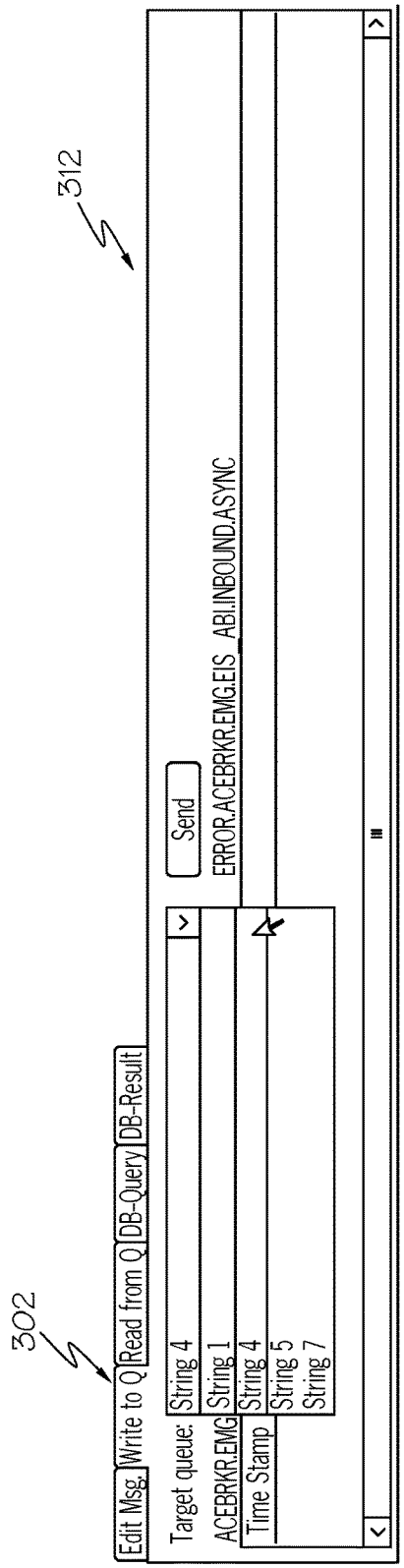
FIG. 3 depicts an exemplary window for writing a component of a message to a channel in a messaging system.

Referring now to FIG. 3, a window 312 is presented. Window 312 is a depiction of window 212, shown in FIG. 2, after a user has clicked the tab 302. Clicking tab 302 allows EDICTP 148 to support multiple target computing environments by communicating with multiple environments established according to a project specific landscape. For example, in a tool environment defined by a channel definition for messages (e.g., message queue name, error queue name, database user resource locator (URL), login credentials, etc.), the user can select a target environment by choosing the corresponding environment name in the dropdown list. In this case, the user has selected "String 4", which corresponds to a string in the channel. However, the attempt to input data segment 208 (shown in FIG. 2) results in an error, since data segment 208 was not properly syntaxed for String 4. That is, String 4 may require data segments to be syntaxed for an application sender's code, but data segment 208 was (properly or improperly) formatted/syntaxed for an application receiver's code. In one embodiment, this failure to write results in an entry being made into an error queue, which includes a time stamp and a routine name, along with the user message text.

Figures 4, 5:
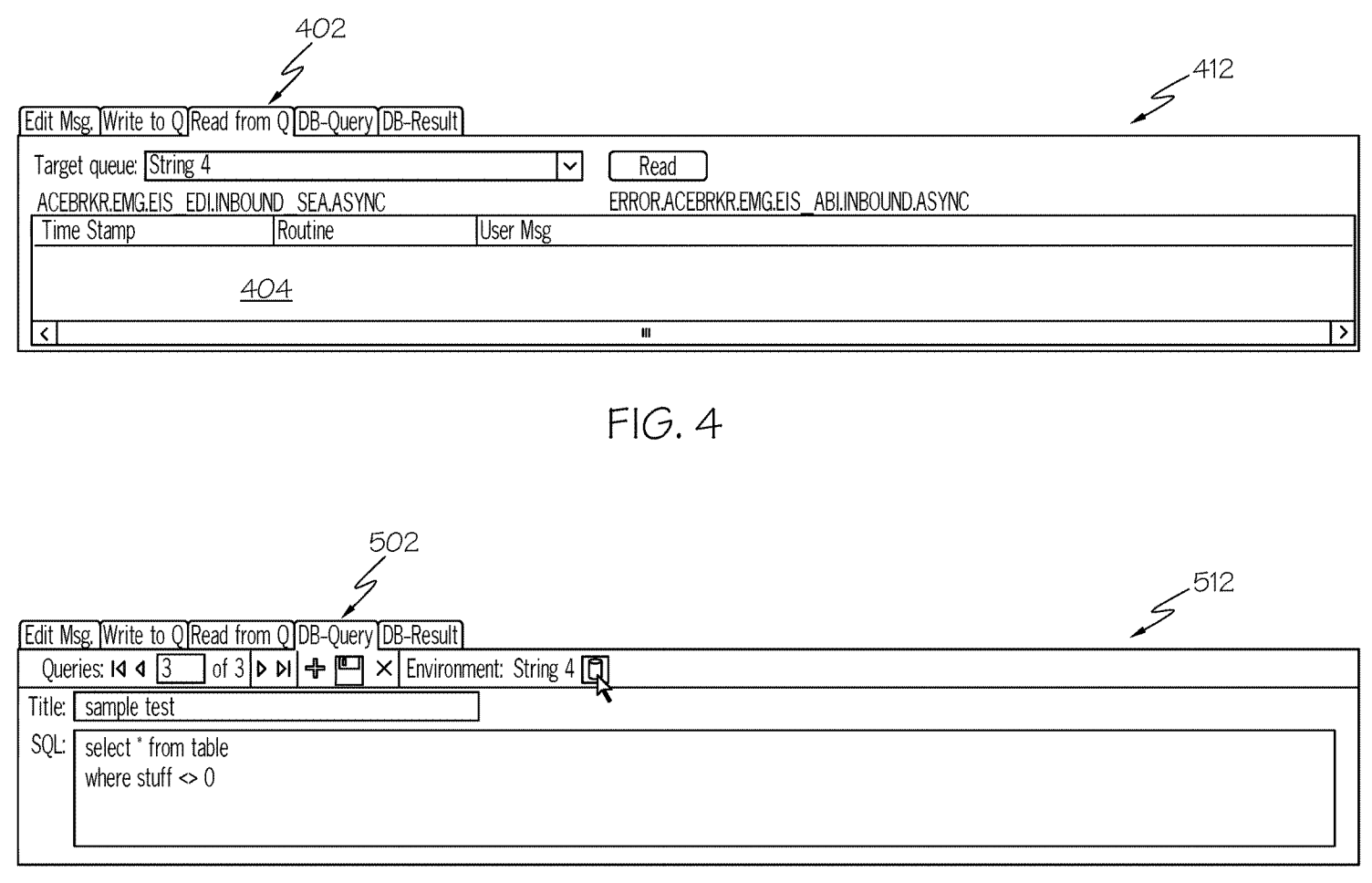

Referring now to FIG. 4, a window 412 is presented. Window 412 is a depiction of window 212, shown in FIG. 2, after a user has clicked the tab 402. Clicking tab 402 allows EDICTP 148 to enable a read from a channel. Again, however, an error results, since the data in "String 4" was not properly formatted for that channel when it was written/stored earlier. When the user clicks the Read button (tab 402) any success or error messages generated during the process of sending the EDI message to the queue will be logged in the view along with the time stamp, routine name, and user message text. If the read had been successful, then the number of messages in the queue and the numbered list of messages would have been logged as well. Double-clicking on a message item (not shown) in a list 404 (exemplary list also not shown) will display a parsed message header and a body of the payload.

Referring now to FIG. 5, a window 512 is presented. Window 512 is a depiction of window 212, shown in FIG. 2, after a user has clicked the tab 502. Clicking tab 502 allows EDICTP 148 to enable a query from a database by maintaining a collection of queries that can be executed against any selected environment. Any success or error messages generated during the process of querying the database (e.g., from a relational database management service) will be logged in the view along with the time stamp, routine name, and user message text. The result of a successful query execution is displayed on the DB-Result tab in the form of a simple table.

Figure 6:
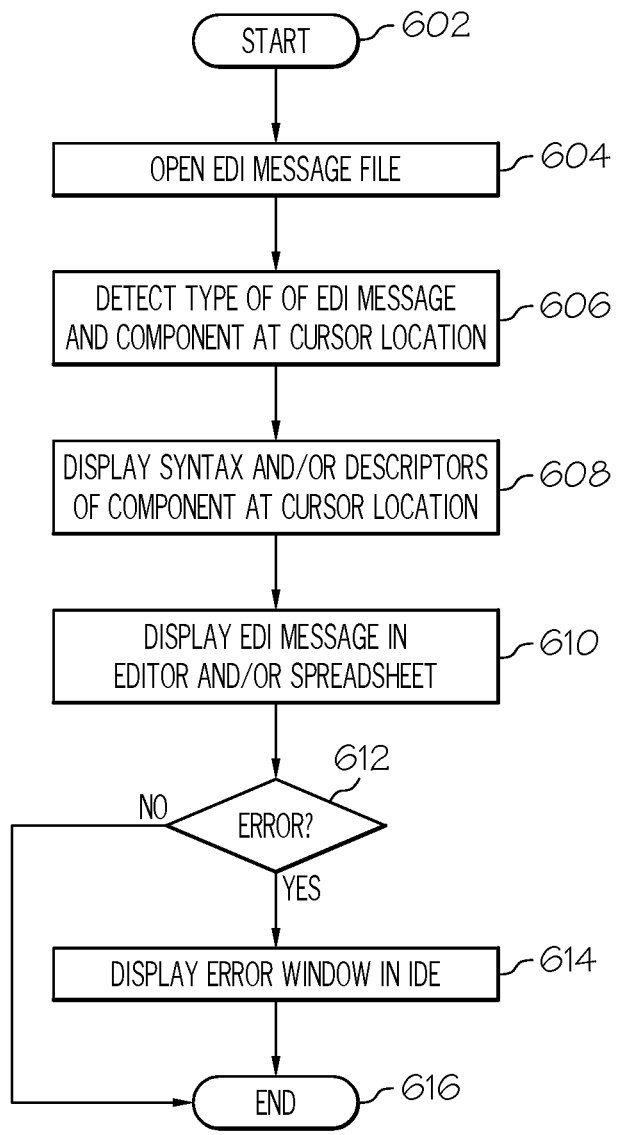
FIG. 6 is a high-level flow chart describing one or more exemplary steps performed by a processor to identify syntaxes used by disparately syntaxed components of a message file.

Referring now to FIG. 6, a high-level flow chart describing one or more exemplary steps performed by a processor to identify syntaxes used by disparately syntaxed components of a message is presented. After initiator block 602, a message file having disparately syntaxed components is opened at a computer (block 604). In one embodiment, the computer that opens the message file may be the same computer that initially received the message from a remote sender. In another embodiment, the computer that opens the message file may be a different computer from the computer that initially received the message, such that the initial receiver transferred (either at the behest of the initial receiving computer or upon the initiative of another analyzing computer) to the other analyzing computer. In one embodiment, this message is an EDI message as described above. This EDI message may follow a standardized business-to-business (b2b) message syntax for disparate transaction types communicated between two enterprises. In another embodiment, such an EDI message comprises components that utilize two or more syntaxes derived from a group of protocols consisting of Customs Automated Manifest Interface Requirements (CAMIR), ANSI X.12, Electronic Data Interchange For Administration, Commerce and Transport (EDIFACT), and Customs and Trade Automated Interface Requirements (CATAIR). That is, in one embodiment, each EDI message follows a same protocol (CAMIR, ANSI X.12, etc.), but each subcomponent follows a different syntax (e.g., for a name, address, order format, etc.). In an alternate embodiment, a single EDI message has subcomponents that each follow a different protocol.

With reference now to block 606, a selection of a selected component from the disparately syntaxed components is detected. As described in block 608, a description of the syntax used by the selected component is then displayed on a user interface, as depicted above in exemplary FIG. 2. In one embodiment, this syntax is identified by a set of leading characters for the selected component. A descriptor of characteristics of data in the selected component, based on the leading characters, can then be displayed.

With reference now to block 610, the processor identifies a set of leading characters for the selected component, and then displays the selected component in an expandable diagram (e.g., an EDI message tree) according to the set of leading characters, as shown in message map 214 in FIG. 2. In another embodiment, the set of leading characters or other descriptors for the selected component allows the components to be organized according to their syntax rules. Based on this organization, the components can be categorized and displayed in an ordered manner on a spreadsheet. That is, the UI on which the EDI message is operated upon can export the components of the EDI message to a spreadsheet automatically, such that each component can be organized and viewed by its syntax. In one embodiment, the EDI message is displayed in an editor window in an integrated development environment (IDE), and/or can be exported to a spreadsheet.

Referring now to query block 612, in response to an attempt to transmit the selected component to another computer resulting in a protocol error-based transmission failure, an error window in the IDE is automatically provided, in order to facilitate correcting an error in the selected component that caused the protocol error-based transmission failure (block 614). In another embodiment, in response to an attempt to receive the selected component from another computer resulting in a protocol error-based transmission failure (query block 612), an error window is automatically presented in the IDE, thus enabling means for correcting an error in the selected component that caused the protocol error-based transmission failure (block 614). The process ends at terminator block 616.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method comprising:
   receiving, by one or more processors, a message at a computer, wherein the message comprises disparately syntaxed components;
   detecting, by one or more processors, a selection of a selected component from the disparately syntaxed components;
   displaying, by one or more processors, a description of a syntax used by the selected component on a user interface, wherein the description of the syntax displayed on the user interface comprises a description of what each data element, within the selected component, represents;
   identifying, by one or more processors, a set of leading characters for the selected component, wherein the set of leading characters for the selected component organizes the disparately syntaxed components according to their respective syntax rules;
   arranging and displaying, by one or more processors, the selected component in a spreadsheet according to the set of leading characters, wherein the disparately syntaxed components are displayed on the spreadsheet according to their respective syntax rules;
   receiving, by one or more processors, a user selection of the selected component;
   determining, by one or more processors, a channel definition for the message, wherein the channel definition is based on a messaging syntax required by a particular channel;
   receiving, by one or more processors, a user selection of the particular channel for transmitting the message;
   determining, by one or more processors, a formatting error in the selected component for the particular channel selected by the user, wherein the formatting error is based on the messaging syntax required by the particular channel;
   reformatting, by one or more processors, the selected component according to the messaging syntax required by the particular channel in order to create a reformatted selected component; and
   transmitting, by one or more processors, the message with the reformatted selected component over the particular channel.

2. The method of claim 1, wherein the message is an electronic data interchange (EDI) message that has been received by a computer, wherein the EDI message follows a standardized business-to-business (b2b) message syntax for disparate transaction types communicated between two enterprises.

3. The method of claim 2, wherein the EDI message comprises components that utilize two or more syntaxes derived from a group of protocols consisting of Customs Automated Manifest Interface Requirements (CAMIR), ANSI X.12, Electronic Data Interchange For Administration, Commerce and Transport (EDIFACT), and Customs and Trade Automated Interface Requirements (CATAIR).

4. The method of claim 1, further comprising:
   displaying, by one or more processors, a descriptor of characteristics of data in the selected component based on the leading characters.

5. The method of claim 1, further comprising:
   displaying, by one or more processors, the selected component in an expandable diagram according to the set of leading characters.

6. The method of claim 1, wherein the description of the syntax identifies which data in the selected component represents a date that the message file was created.

7. The method of claim 1, further comprising:
   in response to an attempt to receive the selected component from another computer resulting in a protocol error-based transmission failure, automatically providing, by one or more processors, an error window, wherein the error window displays a description of an error in the selected component that caused the protocol error-based transmission failure; and editing, by one or more processors, the selected component in order to remove the error in the selected component.

8. The method of claim 1, wherein the user interface is an integrated development environment (IDE).

9. The method of claim 1, further comprising:
displaying, by one or more processors, the disparately syntaxed components in a tree diagram on the user interface;
receiving, by one or more processors, a user selection of a particular syntaxed component from the tree diagram; and
in response to receiving the user selection of the particular syntaxed component, highlighting, by one or more processors, the particular syntaxed component in the message as originally received.

10. The method of claim 1, further comprising:
permanently transforming, by one or more processors, a programmable read only memory (PROM) to perform the method described in claim 1, wherein the PROM is permanently transformed into a new circuitry the performs the method described in claim 1.

11. A computer program product comprising one or more computer readable storage mediums, and program instructions stored on at least one of the one or more storage mediums, the stored program instructions comprising:
program instructions to open a message file, wherein the message file comprises disparately syntaxed components;
program instructions to detect a selection of a selected component from the disparately syntaxed components;
program instructions to display a description of a syntax used by the selected component on a user interface, wherein the description of the syntax displayed on the user interface comprises a description of what each data element, within the selected component, represents;
program instructions to identify a set of leading characters for the selected component, wherein the set of leading characters for the selected component organizes the disparately syntaxed components according to their respective syntax rules;
program instructions to arrange and display the selected component in a spreadsheet according to the set of leading characters, wherein the disparately syntaxed components are displayed on the spreadsheet according to their respective syntax rules;
program instructions to receive a user selection of the selected component;
program instructions to determine a channel definition for the message file, wherein the channel definition is based on a messaging syntax required by a particular channel;
program instructions to receive a user selection of the particular channel for transmitting the message file;
program instructions to determine a formatting error in the selected component for the particular channel selected by the user, wherein the formatting error is based on the messaging syntax required by the particular channel;
program instructions to reformat the selected component according to the messaging syntax required by the particular channel in order to create a reformatted selected component; and
program instructions to transmit the message file with the reformatted selected component over the particular channel.

12. The computer program product of claim 11, wherein the message file is an electronic data interchange (EDI) message that has been received by a computer, wherein the EDI message follows a standardized business-to-business (b2b) message syntax for disparate transaction types communicated between two enterprises.

13. The computer program product of claim 12, wherein the EDI message comprises components that utilize two or more syntaxes derived from a group of protocols consisting of Customs Automated Manifest Interface Requirements (CAMIR), ANSI X.12, Electronic Data Interchange For Administration, Commerce and Transport (EDIFACT), and Customs and Trade Automated Interface Requirements (CATAIR).

14. The computer program product of claim 11, further comprising:
program instructions to display a descriptor of characteristics of data in the selected component based on the leading characters.

15. The computer program product of claim 11, further comprising:
program instructions to display the selected component in an expandable diagram according to the set of leading characters.

16. The computer program product of claim 11, wherein the description of the syntax identifies which data in the selected component represents a date that the message file was created.

17. The computer program product of claim 11, further comprising:
program instructions to, in response to an attempt to receive the selected component from another computer resulting in a protocol error-based transmission failure, automatically provide an error window, wherein the error window displays a description of an error in the selected component that caused the protocol error-based transmission failure.

18. The computer program product of claim 11, wherein the user interface is an integrated development environment (IDE).

19. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
program instructions to open a message file, wherein the message file comprises disparately syntaxed components;
program instructions to detect a selection of a selected component from the disparately syntaxed components;
program instructions to display a description of a syntax used by the selected component on a user interface, wherein the description of the syntax displayed on the user interface comprises a description of what each data element, within the selected component, represents;
program instructions to identify a set of leading characters for the selected component, wherein the set of leading characters for the selected component organizes the disparately syntaxed components according to their respective syntax rules;
program instructions to arrange and display the selected component in a spreadsheet according to the set of leading characters, wherein the disparately syntaxed components are displayed on the spreadsheet according to their respective syntax rules;

program instructions to receive a user selection of the selected component;

program instructions to determine a channel definition for the message, wherein the channel definition is based on a messaging syntax required by a particular channel;

program instructions to receive a user selection of the particular channel for transmitting the message;

program instructions to determine a formatting error in the selected component for the particular channel selected by the user, wherein the formatting error is based on the messaging syntax required by the particular channel;

program instructions to reformat the selected component according to the messaging syntax required by the particular channel in order to create a reformatted selected component; and program instructions to transmit the message with the reformatted selected component over the particular channel.

20. The computer system of claim 19, further comprising:

program instructions to display a descriptor of characteristics of data in the selected component based on the leading characters.

\* \* \* \* \*